(12) United States Patent
Matilainen et al.

(10) Patent No.: US 12,508,651 B2
(45) Date of Patent: Dec. 30, 2025

(54) METHOD FOR MANUFACTURING AN ARTICLE ON TOP OF A BASE DEVICE

(71) Applicant: SANDVIK MACHINING SOLUTIONS AB, Sandviken (SE)

(72) Inventors: Ville-Pekka Matilainen, Sandviken (SE); Per Viklund, Sandviken (SE)

(73) Assignee: Sandvik Machining Solutions AB, Sandviken (SE)

( * ) Notice: Subject to any disclaimer, the term of this patent is extended or adjusted under 35 U.S.C. 154(b) by 44 days.

(21) Appl. No.: 18/037,189

(22) PCT Filed: Nov. 16, 2021

(86) PCT No.: PCT/EP2021/081790
§ 371 (c)(1),
(2) Date: May 16, 2023

(87) PCT Pub. No.: WO2022/106391
PCT Pub. Date: May 27, 2022

(65) Prior Publication Data
US 2024/0017324 A1    Jan. 18, 2024

(30) Foreign Application Priority Data
Nov. 17, 2020  (EP) .................................... 20208100

(51) Int. Cl.
| | |
|---|---|
| *B29C 64/40* | (2017.01) |
| *B22F 7/08* | (2006.01) |
| *B22F 10/28* | (2021.01) |
| *B22F 10/40* | (2021.01) |
| *B22F 12/30* | (2021.01) |
| *B33Y 10/00* | (2015.01) |
| *B33Y 30/00* | (2015.01) |
| *B33Y 40/00* | (2020.01) |

(52) U.S. Cl.
CPC ................ *B22F 10/28* (2021.01); *B22F 7/08* (2013.01); *B22F 10/40* (2021.01); *B22F 12/30* (2021.01); *B29C 64/40* (2017.08); *B33Y 10/00* (2014.12); *B33Y 30/00* (2014.12); *B33Y 40/00* (2014.12)

(58) Field of Classification Search
CPC .............................. B29C 64/245; B29C 64/40
See application file for complete search history.

(56) References Cited

U.S. PATENT DOCUMENTS

2012/0260492 A1* 10/2012 Bonnet ................... B22F 5/007
29/527.2
2016/0144428 A1    5/2016 Mironets et al.
(Continued)

FOREIGN PATENT DOCUMENTS

CA         3051962      *   2/2020
DE    102012011217 A1     12/2013
(Continued)

*Primary Examiner* — Edmund H Lee
(74) *Attorney, Agent, or Firm* — Corinne R. Gorski

(57) ABSTRACT

A method for manufacturing an article on top of a base device with an additive manufacturing device, having a build plate, using an additive manufacturing process is provided. The method includes positioning the base device on the build plate and providing a cover layer on the build plate, wherein the cover layer has a recess for the base device. The method further include manufacturing the article on top of the base device.

9 Claims, 3 Drawing Sheets

(56) References Cited

U.S. PATENT DOCUMENTS

2018/0117854 A1* 5/2018 Hart .................. B29C 64/20
2019/0118469 A1* 4/2019 Donovan ............ B29C 64/245
2020/0130256 A1* 4/2020 Debora .................. B32B 3/02
2020/0307107 A1* 10/2020 Madinger ............ B29C 64/40
2021/0402480 A1* 12/2021 Sweetland ........... B22F 12/88

FOREIGN PATENT DOCUMENTS

DE      102017115989 A1    1/2019
EP          3578364 A1    12/2019
WO     WO2018/143917    *  8/2018

* cited by examiner

METHOD FOR MANUFACTURING AN ARTICLE ON TOP OF A BASE DEVICE

RELATED APPLICATION DATA

This application is a § 371 National Stage Application of PCT International Application No. PCT/EP2021/081790 filed Nov. 16, 2021 with priority to EP 20208100.6 filed Nov. 17, 2020.

TECHNICAL FIELD

The present disclosure relates generally to methods for manufacturing an article using an additive manufacturing process, particularly for manufacturing an article on top of a base device.

BACKGROUND

Additive manufacturing, also known as 3D printing, generally involves printing an articulate one layer at a time using specialized systems. In particular, a layer of material may be deposited on the working surface, such as the build plate, of a build chamber and bonded with another layer of the same or of a different material. Additive manufacturing may be used to manufacture articles from computer-aided design models using techniques such as powder bed fusion (PBF).

In some applications, additive manufacturing may be used to manufacture an article on top of an already existing base device, commonly referred to as a blank, and such articles are often referred to as hybrid articles.

When manufacturing hybrid articles, the article to be manufactured is generally not manufactured directly onto the build plate, but instead on to the base device. This entails that the build plate is not as impacted as in additive manufacturing processes where the article is manufactured directly onto the build plate. However, during the manufacturing process the build plate will still be affected by loose powder falling onto it.

Furthermore, in some cases it can be desirable to manufacture other structure at the same time as the hybrid article, for example in case the article requires a support structure during manufacturing, or in the case of manufacturing quality control pieces. Quality control pieces are separate objects manufactured with pre-defined parameters on which testing and quality control can be performed. However, these structures are generally manufactured directly onto the build plate, thus negatively impacting it more than would be required for just manufacturing the article itself. It would be beneficial to provide a way for manufacturing hybrid articles without affecting the build plate as negatively as current methods.

Consequently, there exists a need for improvement when it comes to manufacturing of hybrid articles.

SUMMARY

It is an object of the invention to address at least some of the problems and issues outlined above. An object of embodiments of the invention is to provide an additive manufacturing method which enables manufacturing of additional articles during the manufacturing of a hybrid article. Another object is to provide an additive manufacturing method in which the build plate is better protected than current methods.

According to one aspect, a method for manufacturing an article on top of a base device with an additive manufacturing device using an additive manufacturing process is provided, wherein the additive manufacturing device comprises a build plate. The method comprises positioning the base device on the build plate and providing a cover layer on the build plate, the cover layer comprising a first recess for the base device. The method further comprises manufacturing the article on top of the base device.

According to an optional embodiment, the method may further comprise manufacturing another structure on top of the cover layer. In some embodiments, the manufacturing of the article and the manufacturing of the another structure may be performed simultaneously.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

The present disclosure relates to manufacturing an article, particularly manufacturing an article on top of a base device using an additive manufacturing process, such as a Powder Bed Fusion, PBF, process, in an additive manufacturing device. The method comprises positioning the base device on the build plate, and then providing a cover layer on the build plate, wherein the cover layer comprises a first recess for the base device. The method further comprises manufacturing the article on top of the base device, and optionally manufacturing another structure on top of the cover layer.

An insight underlying the present disclosure is that, when manufacturing hybrid articles, it becomes possible to achieve a manufacturing process during which the build plate is much less negatively affected than usual, by providing an intermediate protective layer in between the build plate and the article to be manufactured on top of the base device, wherein the cover layer protects the build plate, e.g. from falling loose powder during a manufacturing process.

Another advantage is that it becomes possible to manufacture additional features, such as a support for the article being manufactured, without impacting the build plate in such a way that it needs to be modified after each manufacturing process. One case where this is relevant is when the article to be manufactured comprises an overhang portion with a relatively low angle, e.g. below 45 degrees, since such overhang portions are difficult or impossible to manufacture without using a support for the overhang portion. Other relevant examples include that quality control pieces may be manufactured on the cover layer, and that another article may be manufactured on the cover layer, which is not a hybrid article.

Figure 1:
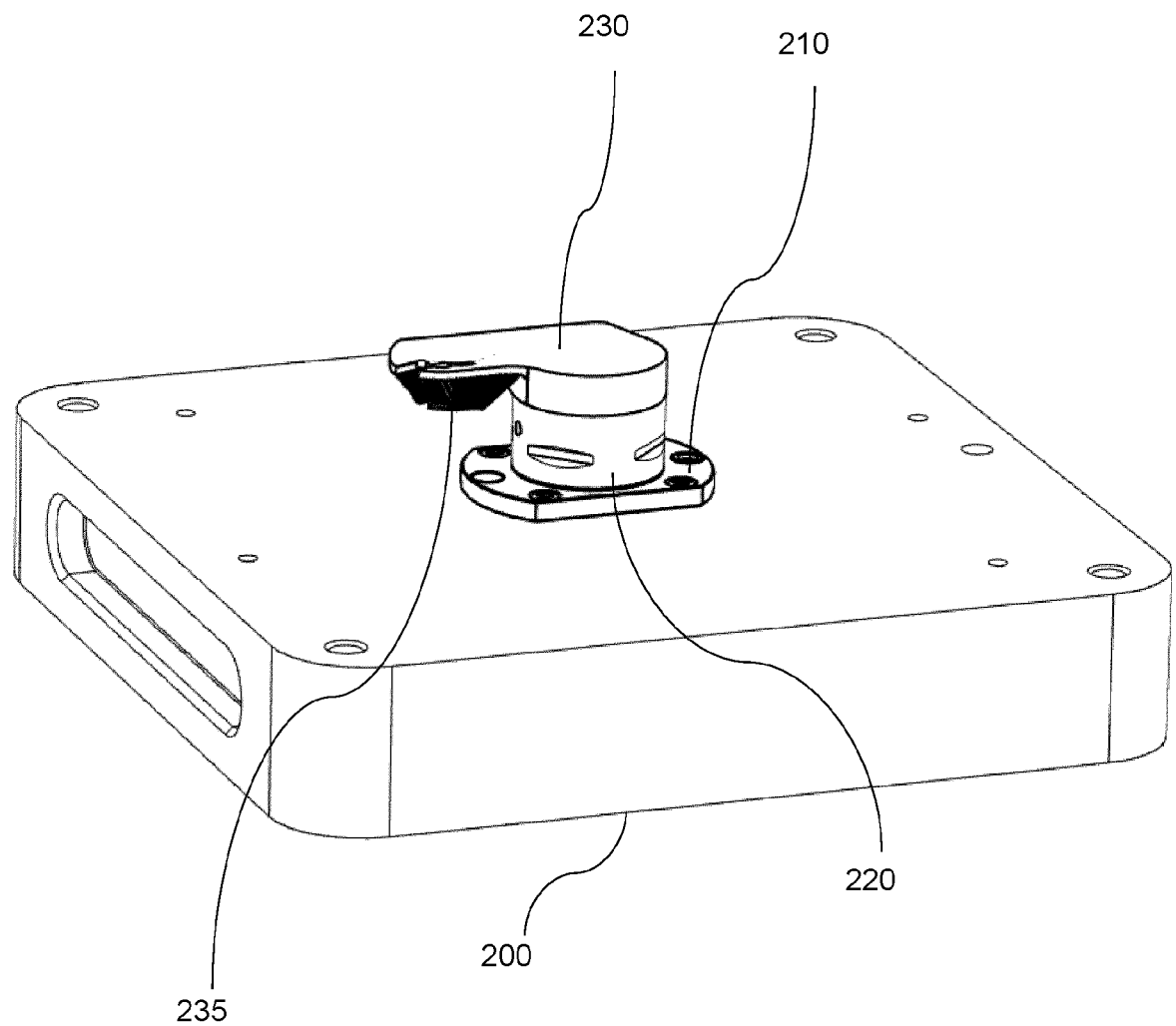
FIG. 1 shows a build plate according to an embodiment.

Looking now at FIG. 1, a build plate 200 comprising a base device 220 and a receptacle 210 is shown. The image further shows an article 230 on top of one of the base device 220, and a support 235 for the article.

In some embodiments, the base device 220 can be positioned directly onto the build plate, without additional features. In some embodiments, the build plate 200 may optionally comprise a receptacle 210, as in the figure, for the base device 220, wherein the receptacle 210 is adapted for receiving and fastening the base device 220.

The receptacle 210 may be any type of receptacle, and is adapted based on which type of base device 220 it is intended to receive. In some embodiments, the receptacle 210 is a hole in the build plate, for example in embodiments wherein the base device is has a conical or cylindrical shape. In other embodiments, such as the one shown in FIG. 1, the receptacle 210 is fastened to the build plate 200 with fastening devices such as screws. In some embodiments, the receptacle 210 may further comprise additional fastening devices for securing the base device in the receptacle.

The base device 220 is a device upon which an article is to be manufactured using additive manufacturing technologies. The base device 220 may for example be a drill and the article to be manufactured on top of the drill may be a drill tip. According to some embodiments, the base device is a generic machine interface, such as a Capto, HSK or similar, and the tool is a turning tool. The base device 220 is intended to be a part of the finished article, such that the finished article is constituted by the base device and the article manufactured on top of the base device.

In some embodiments, the base device 220 is a previously manufactured article in need of repair, such as a tool, and the article 230 manufactured on top of the base device 220 is the required reparation of the article.

Figure 2:
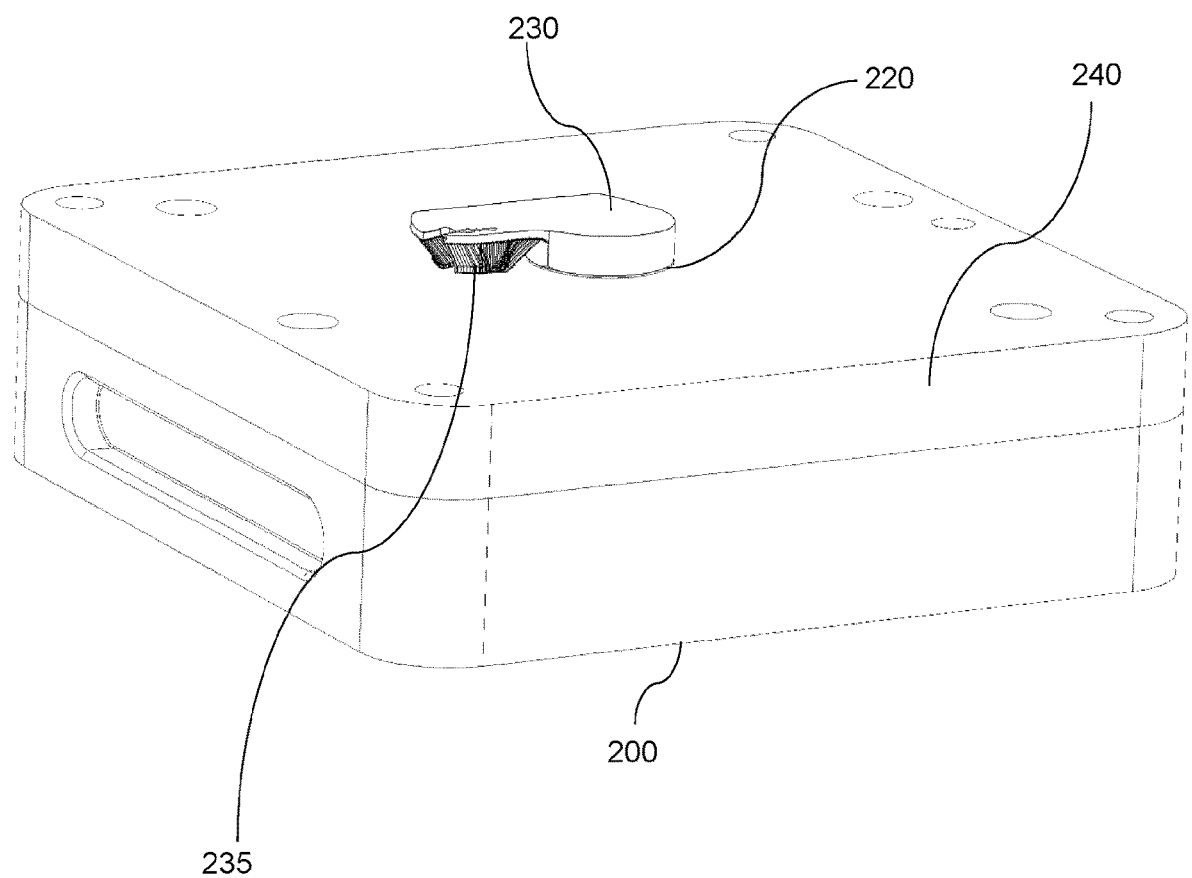
FIG. 2 shows a build plate and a cover layer according to an embodiment.

Looking now at FIG. 2, another embodiment of a build plate 200 is shown, comprising only one base device 220 and further comprising a cover layer 240. The base device 220 is barely showing the figure, but is located directly beneath the article 220 just as in FIG. 1. The cover layer comprises a first recess for the base device and optionally for the receptacle as well, in embodiments comprising one. The figure further shows a support 235 for the article 230 manufactured on the cover layer 240, which is an example of an additional structure than can be manufactured on the cover layer. Other examples include quality control pieces and additional non-hybrid articles. In some embodiments, the additional structures may be manufactured anywhere on the cover layer. In some embodiments, the additional structures may be manufactured in proximity of the article 230.

In some embodiments, the first recess and the base device are adapted such that there is a difference in reflective characteristics between the base device and the first recess, which may be relevant for calibration purposes of the additive manufacturing device. In some embodiments, the difference in reflective characteristics is achieved by having a gap between the cover layer and the base device. In some embodiments, the difference in reflective characteristics is achieved by having a height difference between the cover layer and the top of the base device.

The cover layer 240 acts as a protective layer for the build plate 200, and may also provide a surface for other structures to be manufactured on. In some embodiments, the cover layer 240 may further comprise a second recess for an insert, wherein the insert is adapted to have a structure manufactured thereon. A reason for having an insert on top of the cover layer 240 is similar to the reason for having a cover layer 240 on top of the build plate 200, namely to protect the cover layer 240 by providing a surface on which additional features may be manufactured without negatively impacting the build plate. An insert may be made much smaller than the cover layer itself, and may thus be cheaper to manufacture and replace.

An additional purpose of the cover layer 260 is to provide a more level surface for the manufacturing process. Before any manufacturing using additive manufacturing processes is performed, it may in some embodiments be required to fill the build plate with powder, such that all components are located at substantially the same level. By having a cover layer 260, this function can be provided by the cover layer 260, at least to some extent, and decrease the need for additional powder for levelling purposes. To this end, the cover layer may in some embodiments comprise a material with low density, in order to take up a relatively large amount of space for a relatively low cost. In some embodiments, the height of the cover layer 260 is based on the height of the base device. In some embodiments, the cover layer 260 has approximately the same height as the base device.

In some embodiments, the cover layer 260 is provided such that there is a gap between the cover layer 260 and the base device 220. Such a gap makes it easier to adjust the base device 220 without removing the cover layer 260, and can also provide a difference in reflective characteristics, which may be used for positioning the article 230 on top of the base device 220.

In some embodiments, the gap between the cover layer 260 and the base device 220 is 2-10 mm wide, preferably around 5 mm. In some embodiments, the gap between the cover layer 260 and the base device 220 is 5-15 mm deep, preferably around 10 mm.

In some embodiments, the cover layer 260 may comprise a re-sealable hole on a side surface, which may be sealable by way of a screw or similar. By having such a re-sealable hole, it may be possible to adjust the base device more easily without removing the cover layer 260, by removing the seal covering the hole and interacting with the base device 220 through the hole.

In some embodiments, the cover layer comprises a material which is compatible with the additive manufacturing material. The compatibility of the materials may be required for metallurgical reasons, and being compatible entails, in some embodiments, that the materials are weldable to each other. In some embodiments, being compatible entails that the manufacturing material and the material of the cover layer should be from the same group, for example if the manufacturing material is steel then the cover layer comprises steel, if the manufacturing material comprises titanium then the cover layer comprises titanium, and so on.

In some embodiments, the cover layer 260 may comprise a plurality of parts that can be connected together to form the cover layer 260. Depending on the shape of the base device, the article to be manufactured, optionally the shape of a receptacle, and similar characteristics, it may be beneficial to be able to provide and remove the cover layer in pieces rather than as a whole. In some embodiments, the cover layer comprises two parts, in some embodiments it comprises three parts and in some embodiments it comprises four parts. In some embodiments, it comprises as many parts as the base device has corners.

The build plate 200 may be adapted for having one base device positioned thereon, and it may be adapted for having multiple base devices positioned thereon. In some embodiments, the number of base devices on the build plate is evenly divisible by the number of energy sources in the additive manufacturing device.

In some embodiments, the first and/or second recess further comprises a seal, which reduces the possibility of any loose powder to slip through the recess.

Figure 3:
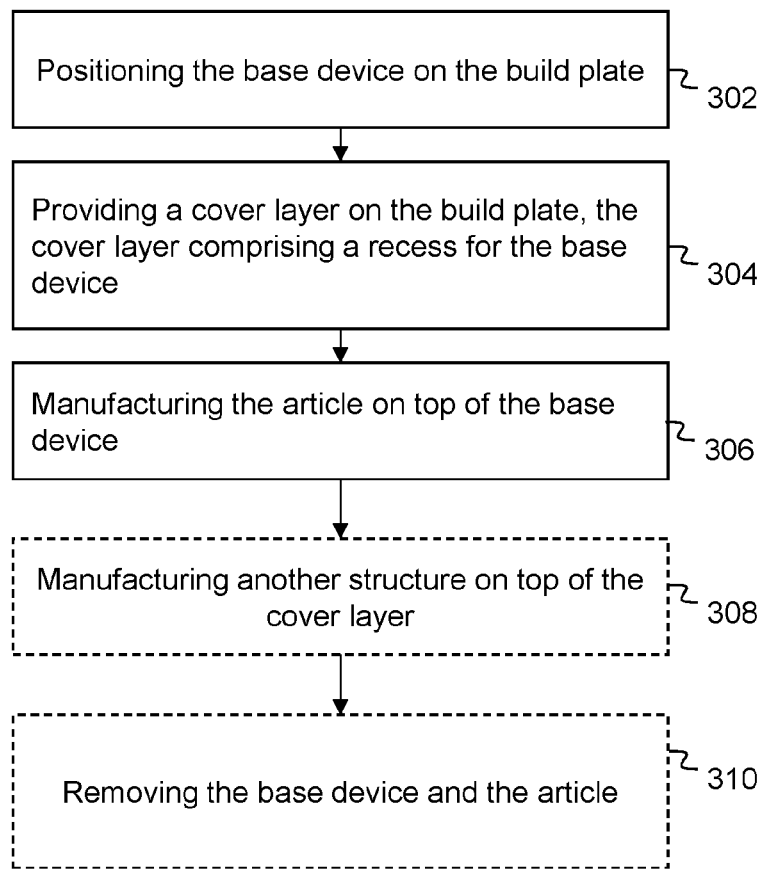
FIG. 3 schematically shows steps of a method according to an embodiment.

Looking now at FIG. 3, steps of a method according to an embodiment will now be described.

The method comprises positioning 302 the base device on the build plate. In some embodiments, the positioning 302 may entail simply placing the base device on the build plate. In some embodiments, the positioning 302 comprises fastening the base device on the build plate using fastening devices, such as screws or pins. In some embodiments, the build plate may comprise a receptacle, and then the positioning 302 may comprise fastening and/or positioning the base device in the receptacle.

The method further comprises providing 304 a cover layer on the build plate, the cover layer comprising a first recess for the base device. The cover layer may in some embodiments be provided across the build plate, such that all of the build plate, or substantially all of the build plate, is covered by the cover layer. In some embodiments, the cover layer is only provided on a part of the build plate, as long as it can still protect the build plate as intended.

The term first recess is here intended to encompass any modification of the cover layer needed to accommodate the base device, which may have virtually any shape and form, depending on the features of the base device.

In some embodiments wherein the cover layer comprises a plurality of parts, the providing 304 step comprises positioning each part of the cover layer on top of the build plate, and then connecting the parts together.

The method further comprises manufacturing the article on top of the base device.

In some embodiments, the method may further comprise manufacturing 308 another structure on top of the cover layer. Such a structure may for example be a support for the article, or it may be quality control pieces, or another article which is not a hybrid article. In some embodiments, the manufacturing 308 of the another structure and the manufacturing 306 of the article on top of the base device are performed in the same additive manufacturing process. In some embodiments, the manufacturing 308 of the another structure and the manufacturing 306 of the article on top of the base device are performed simultaneously.

In some embodiments, the method may further comprise a step of covering the cover layer with powder prior to the manufacturing, in order to provide a level surface for the manufacturing process. In some embodiments, this entails covering the build plate with powder up to the same height as the top of the base device, and such that no part of the cover layer protrudes above the powder. In some embodiments, this may be preceded by a step of adjusting the base device such that the top of the blank is the highest part of the build plate.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A method for manufacturing a hybrid article on top of a base device, the base device being a device upon which the hybrid article is to be manufactured, with an additive manufacturing device using an additive manufacturing process, the additive manufacturing device including a build plate, the method comprising:
    positioning the base device on the build plate;
    providing a cover layer on the build plate, wherein the cover layer including a first recess, wherein the base device is arranged in the first recess;
    manufacturing the hybrid article on top of the base device arranged in the first recess; and
    manufacturing a support structure for the hybrid article on top of the cover layer.

2. The method according to claim 1, wherein the manufacturing of the support structure and the manufacturing of the hybrid article on top of the base device are performed in the same additive manufacturing process.

3. The method according to claim 1, wherein the cover layer includes a second recess arranged for receiving an insert, wherein the support structure is printed on the insert.

4. The method according to claim 1, wherein the cover layer comprises a material with a low density.

5. The method according to claim 1, wherein the cover layer comprises a heat resistant material.

6. The method according to claim 1, wherein the cover layer comprises a material which is compatible with the additive manufacturing material.

7. The method according to claim 3, wherein the first and/or second recess includes a seal.

8. The method according to claim 1, wherein the first recess includes a part with different reflective characteristics compared to the base device, in proximity of the base device.

9. The method according to claim 1, wherein the base device and the cover layer are provided at substantially a same height.

* * * * *